United States Patent
Wang

(10) Patent No.: US 9,387,747 B2
(45) Date of Patent: Jul. 12, 2016

(54) RETRACTABLE DOOR DEVICE OF A UTILITY VEHICLE

(71) Applicant: Liang-Hsiung Wang, Tainan (TW)

(72) Inventor: Liang-Hsiung Wang, Tainan (TW)

(73) Assignee: Liang-Hsiung Wang, Tainan (TW)

( * ) Notice: Subject to any disclaimer, the term of this patent is extended or adjusted under 35 U.S.C. 154(b) by 0 days.

(21) Appl. No.: 14/722,969

(22) Filed: May 27, 2015

(65) Prior Publication Data
US 2016/0114660 A1    Apr. 28, 2016

(30) Foreign Application Priority Data
Oct. 23, 2014    (TW) ............................. 103218847 U

(51) Int. Cl.
| | |
|---|---|
| B60J 5/04 | (2006.01) |
| B60J 5/06 | (2006.01) |
| E06B 3/46 | (2006.01) |
| E06B 3/48 | (2006.01) |

(52) U.S. Cl.
CPC ................ B60J 5/0487 (2013.01); B60J 5/062 (2013.01); E06B 3/4636 (2013.01); E06B 3/487 (2013.01)

(58) Field of Classification Search
CPC . B60R 2021/028; E06B 3/4636; E06B 3/487; E05F 17/004; B60J 5/062; B60J 5/06; B60J 5/0487; E05Y 2900/531
USPC .......... 296/146.1, 146.11, 146.5, 146.6, 147, 296/148
See application file for complete search history.

(56) References Cited

U.S. PATENT DOCUMENTS

| | | | | |
|---|---|---|---|---|
| 4,392,660 A * | 7/1983 | Mason | ................... | B60J 5/0487 105/440 |
| 5,393,118 A * | 2/1995 | Welborn | ................ | B60J 5/0487 280/DIG. 5 |
| 5,529,369 A * | 6/1996 | Welborn | ............... | B60J 5/0487 280/DIG. 5 |
| 6,135,497 A * | 10/2000 | Sutherland | ............. | B60R 21/08 280/748 |
| 6,158,801 A * | 12/2000 | Tucker | ................... | B60J 5/0487 296/146.1 |
| 7,125,069 B2 * | 10/2006 | Cacucci | .................. | B60R 21/02 280/271 |
| 8,292,352 B2 * | 10/2012 | Furman | .................. | B60J 5/0487 280/748 |
| 8,465,050 B1 * | 6/2013 | Spindler | ................ | B60R 21/06 280/749 |
| 2002/0153718 A1 * | 10/2002 | Schneider | ................ | B60J 5/042 280/748 |
| 2003/0168902 A1 * | 9/2003 | Wiener | .................... | B60J 5/042 297/487 |
| 2004/0061356 A1 * | 4/2004 | Martini | ................. | B60J 5/0487 296/153 |

(Continued)

*Primary Examiner* — Katherine Mitchell
*Assistant Examiner* — Justin Rephann
(74) *Attorney, Agent, or Firm* — Withrow & Terranova, PLLC

(57) ABSTRACT

A retractable door device of a utility vehicle has a retractable door plate assembly and at least one retractable assembly. The retractable door plate assembly has multiple door plates of different sizes that are concatenated in descending order of size. The concatenated door plates are extendable and retractable. The retractable assembly has a retractor and a flexible elongated body. The retractor is mounted in the largest door plate. The flexible elongated body is mounted through the multiple door plates, and two ends of the flexible elongated body are respectively connected to the retractor and the smallest door plate. The flexible elongated body can be retracted to and extracted from the retractor.

27 Claims, 10 Drawing Sheets

(56) References Cited

U.S. PATENT DOCUMENTS

| | | | | |
|---|---|---|---|---|
| 2005/0093335 A1* | 5/2005 | Herrmann | | B60J 5/0487 296/146.6 |
| 2005/0093337 A1* | 5/2005 | Herrmann | | B60J 5/0487 296/146.11 |
| 2006/0028053 A1* | 2/2006 | Turnbull | | B60J 5/0487 296/190.08 |
| 2007/0075565 A1* | 4/2007 | Magsaam | | B60J 5/0487 296/146.11 |
| 2009/0243339 A1* | 10/2009 | Orr | | B60J 5/0487 296/190.03 |
| 2012/0032431 A1* | 2/2012 | King | | B60J 5/0487 280/756 |
| 2012/0161468 A1* | 6/2012 | Tsumiyama | | B60J 5/0487 296/146.11 |
| 2013/0087394 A1* | 4/2013 | Sanschagrin | | B60K 5/00 180/54.1 |
| 2013/0199097 A1* | 8/2013 | Spindler | | B60J 5/047 49/394 |
| 2014/0292021 A1* | 10/2014 | Kuroda | | B60J 5/0487 296/146.5 |
| 2014/0292027 A1* | 10/2014 | Uchiyama | | B60N 2/36 296/184.1 |
| 2014/0306487 A1* | 10/2014 | Dobrot | | B60J 5/0487 296/190.03 |
| 2015/0014974 A1* | 1/2015 | Cotnoir | | B60R 21/13 280/756 |
| 2015/0175114 A1* | 6/2015 | Schroeder | | B60R 21/06 296/190.03 |
| 2015/0197208 A1* | 7/2015 | Johnson | | B60R 21/13 280/801.2 |

* cited by examiner

US 9,387,747 B2

RETRACTABLE DOOR DEVICE OF A UTILITY VEHICLE

PRIORITY CLAIM

The present application claims priority under 35 U.S.C. 119(a) to Taiwan Application No. 103218847 filed on Oct. 23, 2014, and entitled "RETRACTABLE DOOR DEVICE OF A UTILITY VEHICLE," which is incorporated herein by reference in its entirety.

BACKGROUND OF THE DISCLOSURE

1. Field of the Disclosure

The present disclosure relates to a retractable door, especially a retractable door device applied to a utility vehicle that can provide a protection effect to the occupants.

2. Description of the Prior Arts

A conventional utility vehicle is applicable for traveling on various kinds of terrains. In general terms, the conventional utility vehicle focuses on stiffness and rigidity for providing safety protection to the users. With reference to FIG. 10, two protecting nets or two car doors 51 are respectively mounted on two sides of the utility vehicle to protect the driver and the passenger.

Although the protecting nets or the car doors 51 can be mounted on the entrances of the conventional utility vehicle to provide the protecting function, the conventional protecting nets or car doors 51 cannot provide full protection when traveling on a rugged road or a bush terrain. In addition, the protecting nets or the car doors 51 might block the entrances due to the obstacles of the terrain, so the driver and passengers will be obstructed by the car doors 51 when getting on or off the conventional utility vehicle. For the safety of the conventional utility vehicle, it is necessary to ameliorate the conventional utility vehicle.

To overcome the shortcomings, the present disclosure provides a retractable door device of a utility vehicle to mitigate or obviate the aforementioned problems.

SUMMARY OF THE DISCLOSURE

The primary objective of the present disclosure is to provide a retractable door device of a utility vehicle for solving the drawbacks of the conventional utility vehicle.

The retractable door device of a utility vehicle has a retractable door plate assembly, at least one retractable assembly, a connecting assembly and a fastening assembly.

The retractable door plate assembly has multiple door plates of different sizes that are arranged and concatenated in descending order of size, and the concatenated door plates are extendable to form an overall long plate and are retractable into a largest one of the door plates. Each one of the multiple door plates has a space communicating with the spaces of the other door plates. Each one of the multiple door plates has a first end and a second end. A first end of a smaller door plate of each two adjacent two door plates is limited and positioned in a second end of a larger door plate of said two adjacent door plates.

The retractable assembly has a retractor and a flexible elongated body. The retractor is mounted in the largest door plate of the retractable door plate assembly. The flexible elongated body is mounted through the multiple door plates, and two ends of the flexible elongated body are respectively connected to the retractor and the smallest door plate. The flexible elongated body can be retracted to and extracted from the retractor.

The connecting assembly is mounted on the first end of the largest door plate of the retractable door plate assembly.

The fastening assembly is mounted on the second end of the smallest door plate of the retractable door plate assembly.

Other objectives, advantages and novel features of the disclosure will become more apparent from the following detailed description when taken in conjunction with the accompanying drawings.

DETAILED DESCRIPTION OF THE PREFERRED EMBODIMENTS

Figure 1:
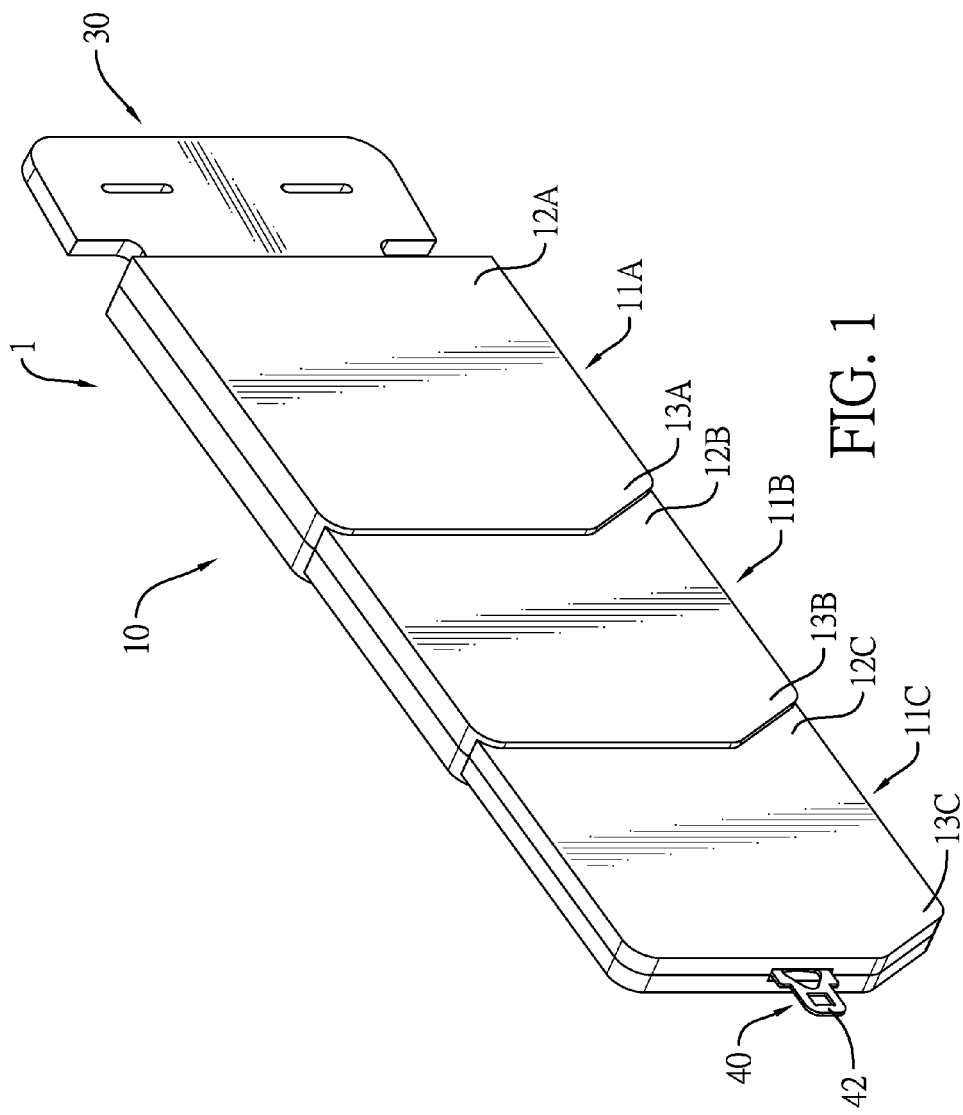
FIG. 1 is a perspective view of a first embodiment of a retractable door device of a utility vehicle in accordance with the present disclosure in an extended state.

With reference to FIGS. 1, 2, 6 and 9, multiple embodiments of a retractable door device 1 of a utility vehicle in accordance with the present disclosure are shown. The retractable door device 1 has a retractable door plate assembly 10, at least one retractable assembly 20, a connecting assembly 30, 30A, and a fastening assembly 40.

With reference to FIGS. 1, 2, 6 and 9, the retractable door plate assembly 10 has multiple door plates including a large door plate 11A, a medium door plate 11B, and a small door plate 11C. The door plates 11A, 11B, 11C are concatenated in descending order of size. The medium door plate 11B and small door plate 11C are extendable to form an overall long plate and can be retracted into the large door plate 11A. Each one of the door plates 11A, 11B, 11C has a space communicating with the spaces of the other door plates 11A, 11B, 11C as shown in FIGS. 2, 3, 6 and 9.

Figure 2:
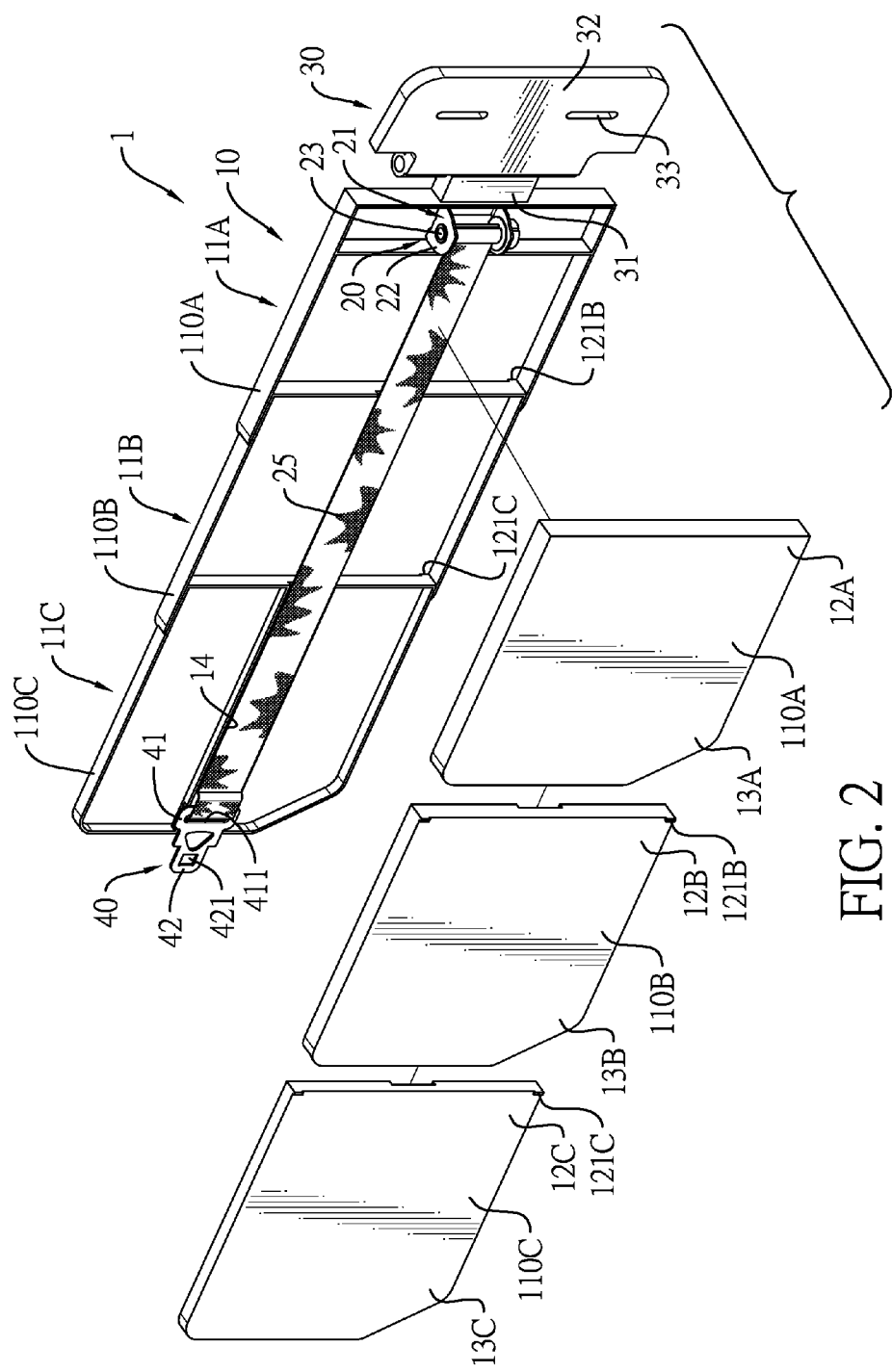
FIG. 2 is a partial exploded perspective view of the retractable door device of a utility vehicle in FIG. 1.
Figure 4:
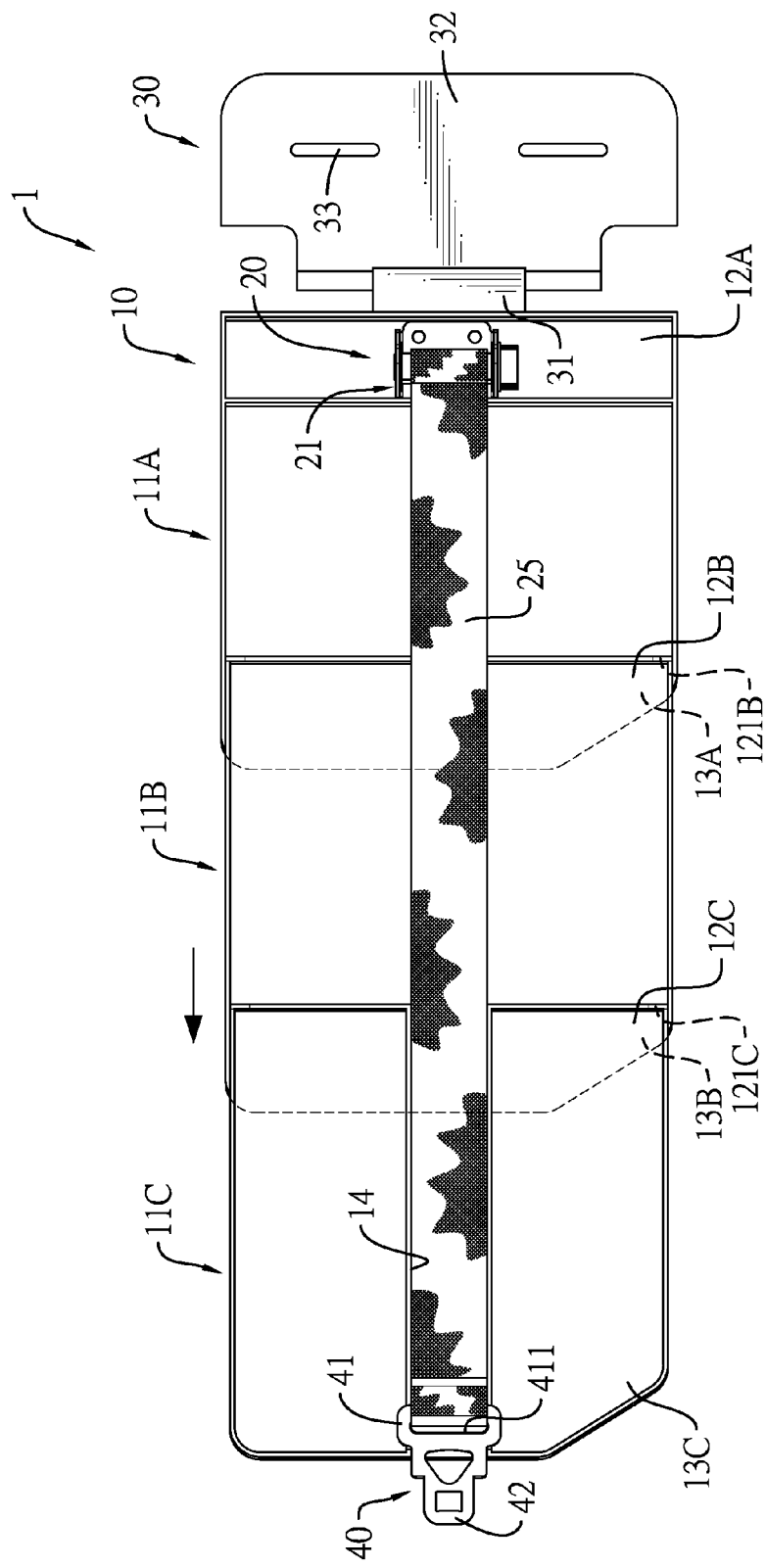
FIG. 4 is a side view of the retractable door device of a utility vehicle in FIGS. 1 and 2 in an extended state.
Figure 6:
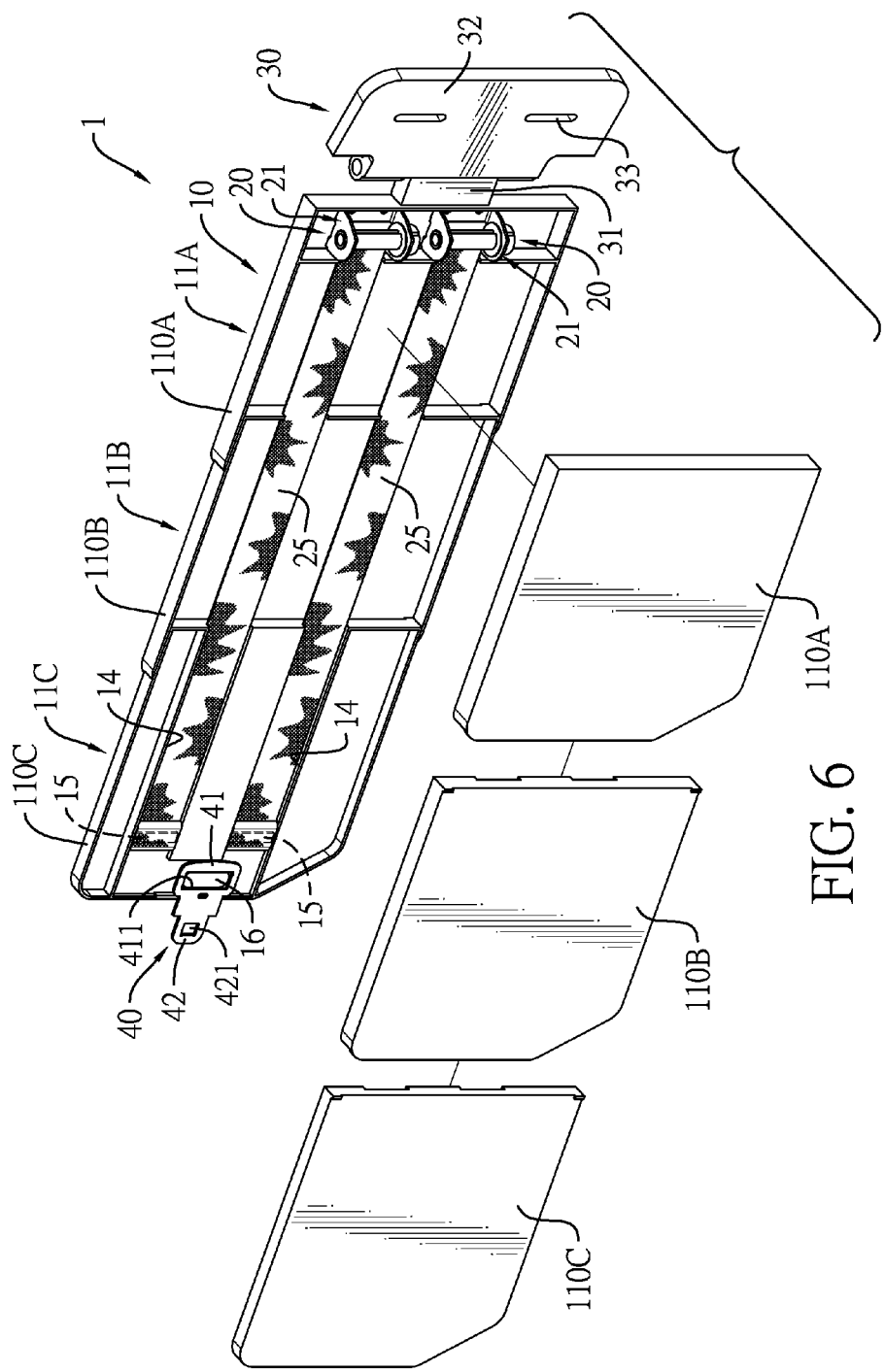
FIG. 6 is an exploded view of a second embodiment of a retractable door device of a utility vehicle in accordance with the present disclosure.
Figure 9:
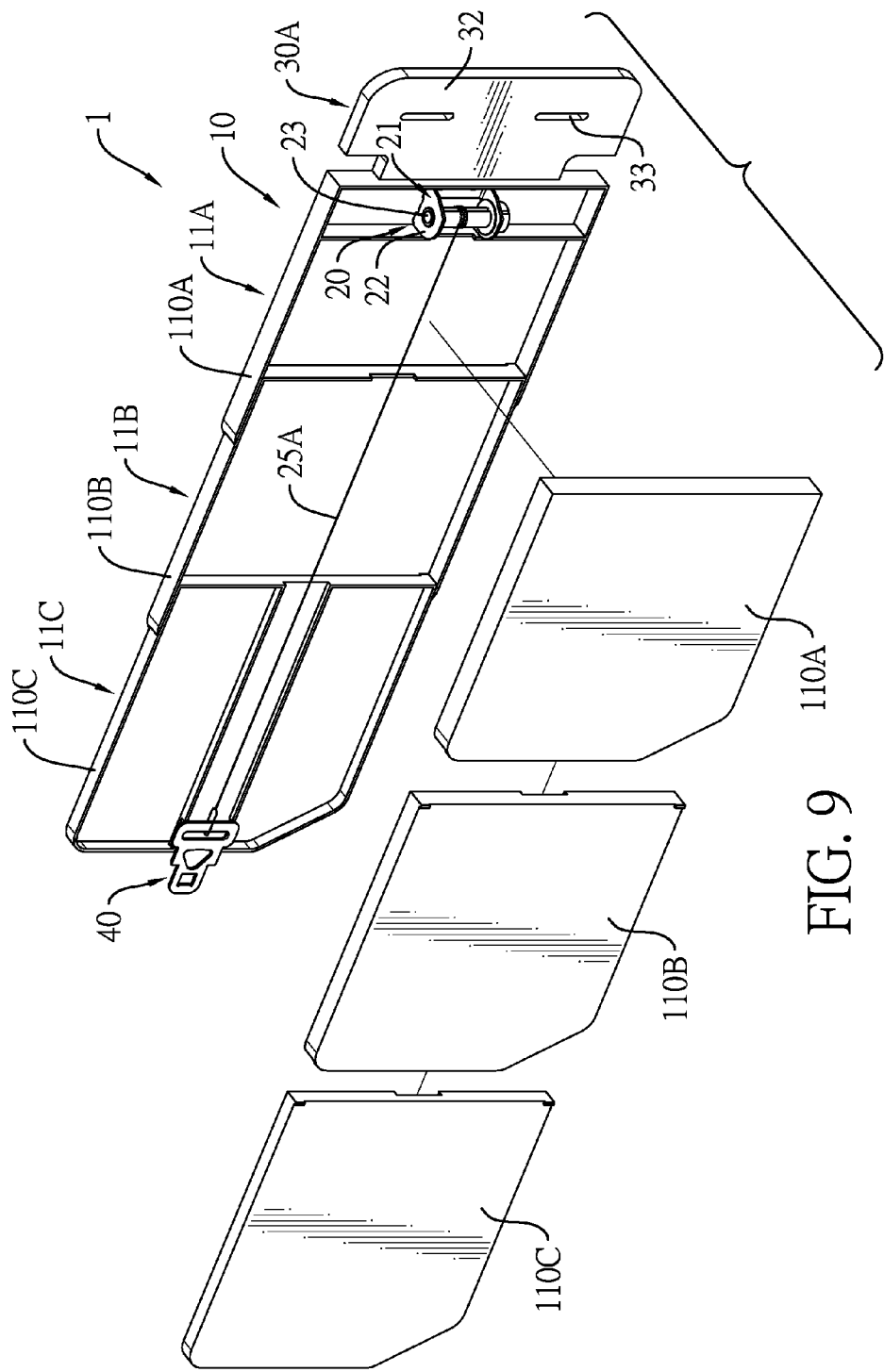
FIG. 9 is an exploded perspective view of a third embodiment of an retractable door device of a utility vehicle in accordance with the present disclosure.
Figure 10:
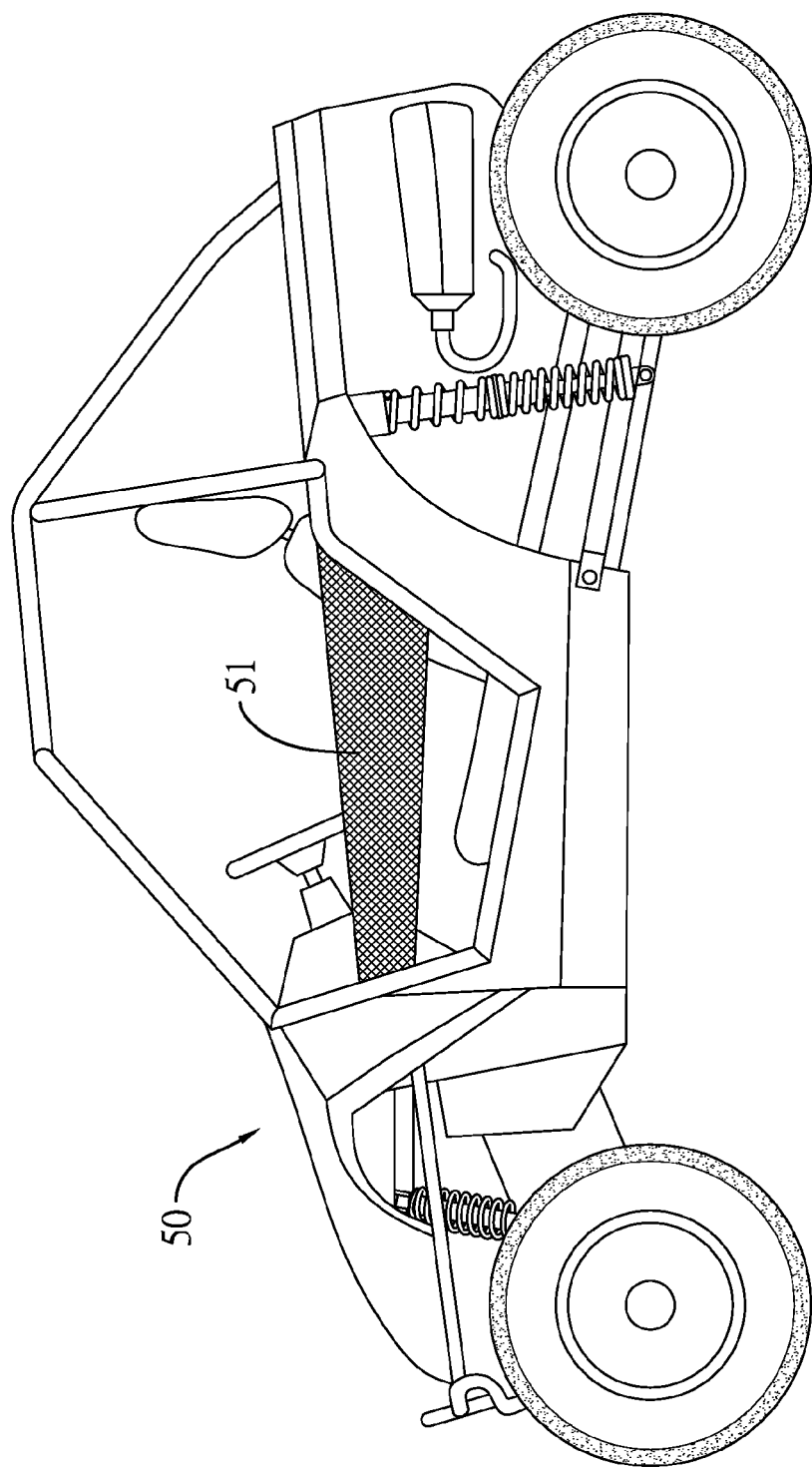
FIG. 10 is a side view of a utility vehicle in accordance with the prior art.

With reference to FIGS. 1, 2, 6 and 9, each one of the large door plate 11A, medium door plate 11B, and small door plate 11C has a first end 12A, 12B, 12C and a second end 13A, 13B, 13C. When the retractable door plate assembly 10 is extended, the first ends 12B, 12C of the medium door plate 11B and small door plate 11C are respectively limited in the second ends 13A, 13B of the large door plate 11A and medium door plate 11B. With reference to FIGS. 2 and 4, each one of the first ends 12B, 12C of the medium door plate 11B and small door plate 11C has a limiting block 121B, 121C. The limiting blocks 121B, 121C are respectively formed on outer surfaces of the medium door plate 11B and small door plate 11C. The first end 12B of the medium door plate 11B and the first end 12C of the small door plate 11C are respectively connected to the second end 13A of the large door plate 11A and the second end 13B of the medium door plate 11B, and are limited by the limiting blocks 121B, 121C. With reference to FIGS. 2, 6 and 9, the door plates 11A, 11B, 11C are assembled by multiple half door plate members 110A, 110B, 110C to form a hollow body. Furthermore, the half door plate members 110A, 110B, 110C are connected securely to each other by screws or other fixing means.

With reference to FIGS. 2, 6 and 9, the retractable door device 1 has one, two or multiple retractable assemblies 20. The at least one retractable assembly 20 is mounted in the retractable door plate assembly 10, and each one of the at least one retractable assembly 20 has a retractor 21 and a flexible elongated body 25, 25A. The retractor 21 is mounted in the large door plate 11A of the retractable door plate assembly 10. The flexible elongated body 25 can be a flat elongated strap as shown in FIGS. 2 and 6, and the flexible elongated body 25A may be a steel wire or a rope as shown in FIG. 9. The flexible elongated body 25, 25A is mounted through the door plates 11A, 11B, 11C, and two ends of the flexible elongated body 25, 25A are respectively connected to the retractor 21 and the small door plate 11C of the retractable door plate assembly 10. The flexible elongated body 25, 25A can be retracted to and extracted from the retractor 21.

Figure 3:
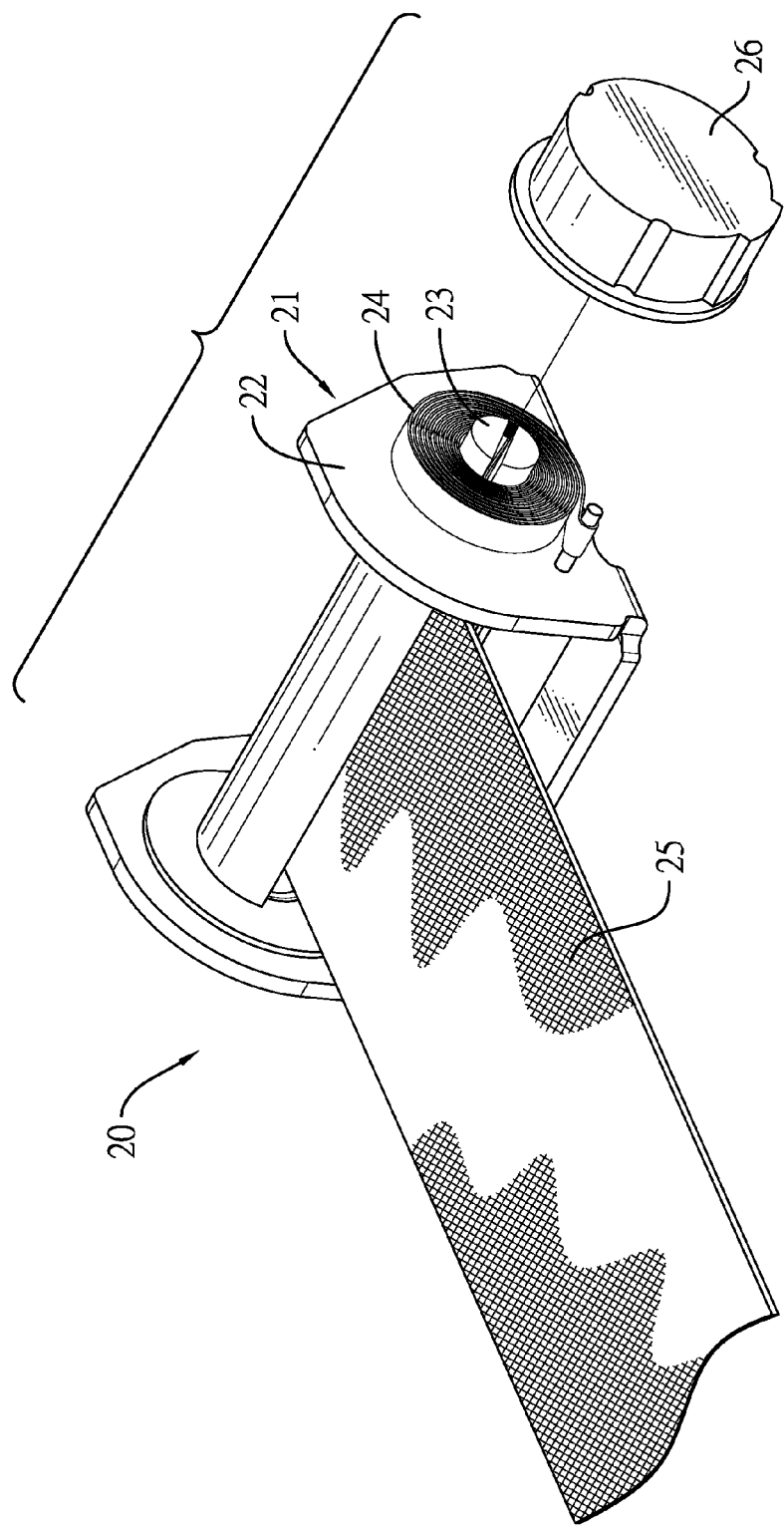
FIG. 3 is an enlarged exploded perspective view of a retractable assembly of the retractable door device in FIG. 2.

With reference to FIGS. 3 and 9, the retractor 21 has a base 22, a coiling shaft 23, and a return spring 24. With reference to FIGS. 2, 3 and 6, the base 22 is mounted securely on an inner surface of the large door plate 11A. The coiling shaft 23 is mounted rotatably in the base 22 and is connected to the one of the ends of the flexible elongated body 25, 25A. The flexible elongated body 25, 25A is connected to the coiling shaft 23. The return spring 24 has two ends, one of the ends of the return spring 24 is mounted securely on the base 22, and the other end of the return spring 24 is connected to the coiling shaft 23. The return spring 24 provides torque acting on the coiling shaft 23 to automatically retract the flexible elongated body 25, 25A around the coiling shaft 23. Preferably, a cover 26 is mounted securely on the base 22 and is mounted around the return spring 24. Said one of the ends of the return spring 24 is connected to the base 22, or is mounted securely in the cover 26 located on the base 22.

With reference to FIGS. 2, 3 and 6, the connecting assembly 30, 30A is mounted on the first end 12A of the large door plate 11A. The connecting assembly 30 has a connecting portion 31 and a connecting plate 32. The connecting portion 31 is connected to the first end 12A of the large door plate 11A. The connecting plate 32 is rotatably connected to the connecting portion 31 and has at least one fixing hole 33 formed through the connecting plate 32.

With reference to FIG. 9, in the first embodiment, the connecting assembly 30A is mounted securely on the first end 12A of the large door plate 11A, and has at least one fixing hole 33 formed through the connecting assembly 30A.

With reference to FIGS. 2, 3 and 6, the fastening assembly 40 has a positioning portion 41 and a fastening portion 42. The positioning portion 41 and the fastening portion 42 are respectively mounted on two opposite ends of the fastening assembly 40. The positioning portion 41 is positioned in the second end 13C of the small door plate 11C. The fastening portion 42 extends beyond the second end 13C of the small door plate 11C and has a fastening hole 421 formed through the fastening portion 42.

With reference to FIGS. 2 and 3, is the first embodiment, the retractable door device 1 has a single retractable assembly 20. The positioning portion 41 has a positioning hole 411 formed through the positioning portion 41, and the flexible elongated body 25 of the retractable assembly 20 is connected to the positioning portion 41 through the positioning hole 411. The retractable door plate assembly 10 further has a limiting groove 14 formed in the small door plate 11C, and the flexible elongated body 25 is positioned in the limiting groove 14 of the small door plate 11C.

Figure 7:
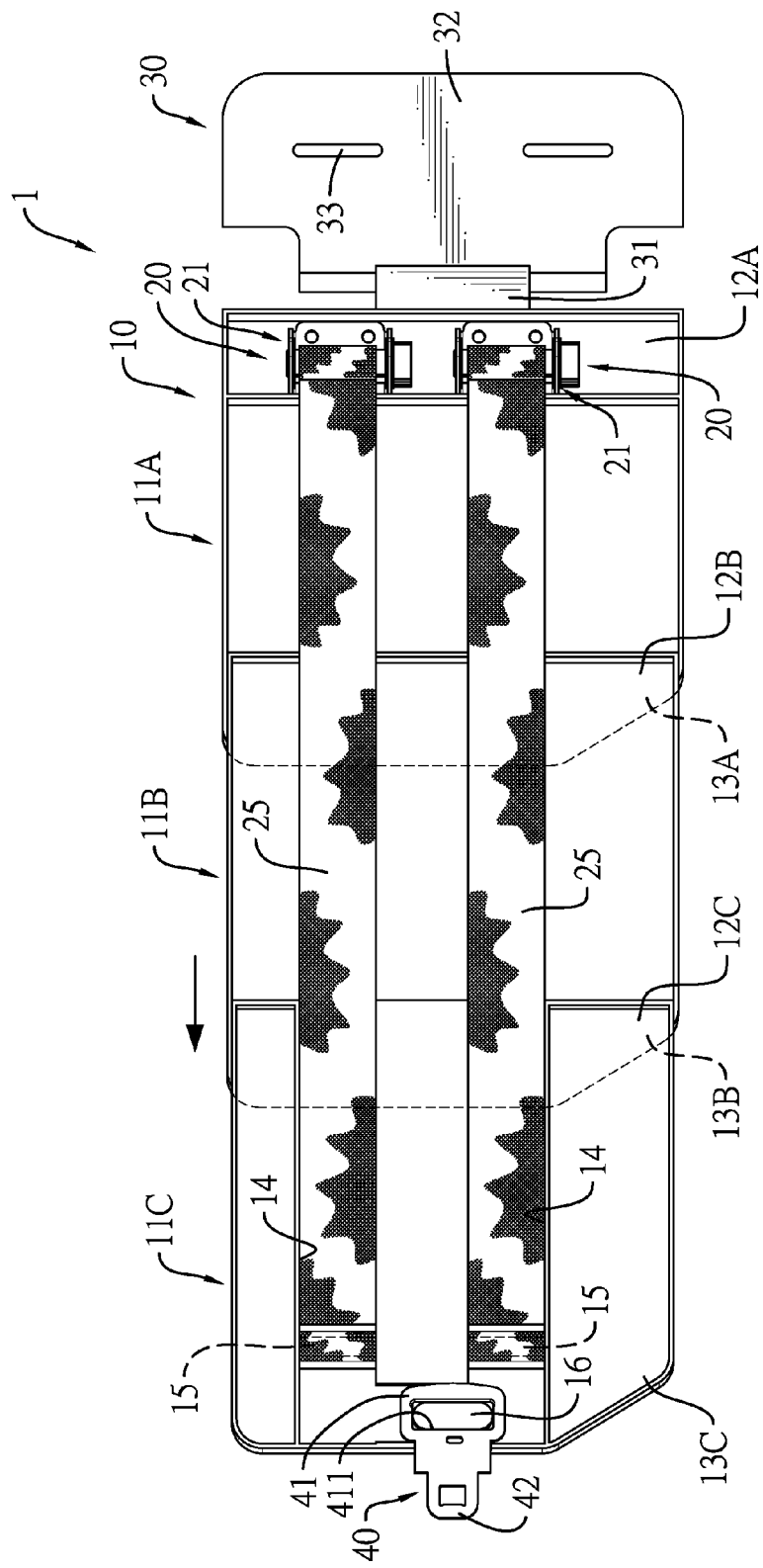
FIG. 7 is a side view of the retractable door device of a utility vehicle in FIG. 6 in an extended state.

With reference to FIGS. 6 and 7, in the second embodiment, the retractable door device 1 has multiple retractable assemblies 20 parallel to each other. The retractable door plate assembly 10 further has multiple limiting grooves 14 formed in the small door plate 11C and corresponding in number to the retractable assemblies 20. The flexible elongated body 25 of each one of the retractable assemblies 20 is located in the limiting groove 14 of the retractable door plate assembly 10. The retractable door plate assembly 10 further has multiple fixing portions 15 respectively formed in the limiting grooves 14 near the second end 13C of the door plate 11C. The flexible elongated bodies 25 of the multiple retractable assemblies 20 are mounted securely and respectively on the fixing portions 15. The positioning portion 41 has a positioning hole 411 formed through the positioning portion 41. The retractable door plate assembly 10 has a locating block 16 formed in the second end 13C of the small door plate 11C. The locating block 16 is securely mounted in the positioning hole 411, so the fastening assembly 40 is securely connected to the second end 13C of the small door plate 11C.

In use, the retractable door device 1 of the present disclosure is applied to a utility vehicle. With reference to FIGS. 4 and 7, the retractable door device 1 is mounted on one side entrance of the utility vehicle by the connecting assembly 30. When a driver and a passenger get on the utility vehicle, the retractable door plate assembly 10 and the retractable assembly 20 are extended towards the opposite side of the entrance of the utility vehicle by pulling the fastening assembly 40. Then, the fastening portion 42 of the fastening assembly 40 is latched securely in a latching part that is mounted on the utility vehicle. At the same time, the flexible elongated body 25 of the retractable assembly 20 is extracted from the retractor 21, and the multiple door plates 11A, 11B, 11C are extended out and are positioned by each other to form a safety side door that fully covers the entrance of the utility vehicle.

Figure 5:
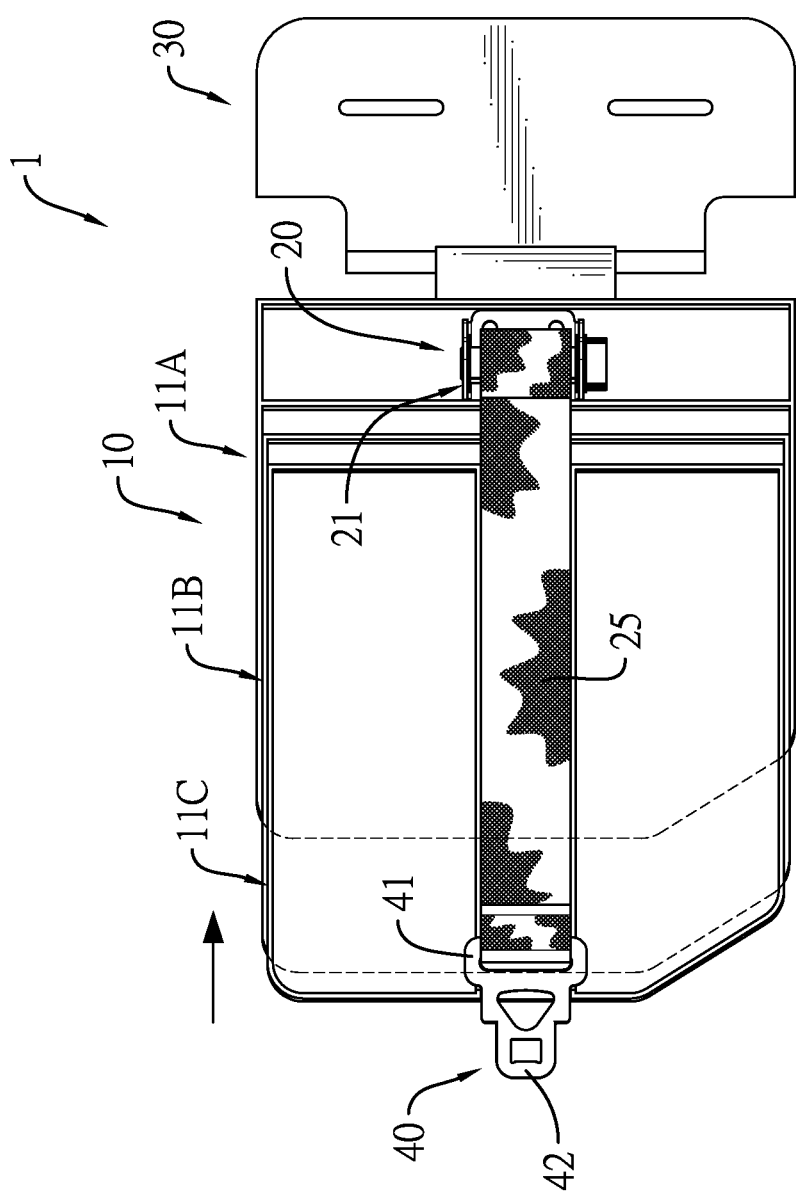
FIG. 5 is a side view of the retractable door device of a utility vehicle in FIGS. 1 and 2 in a retracted state.
Figure 8:
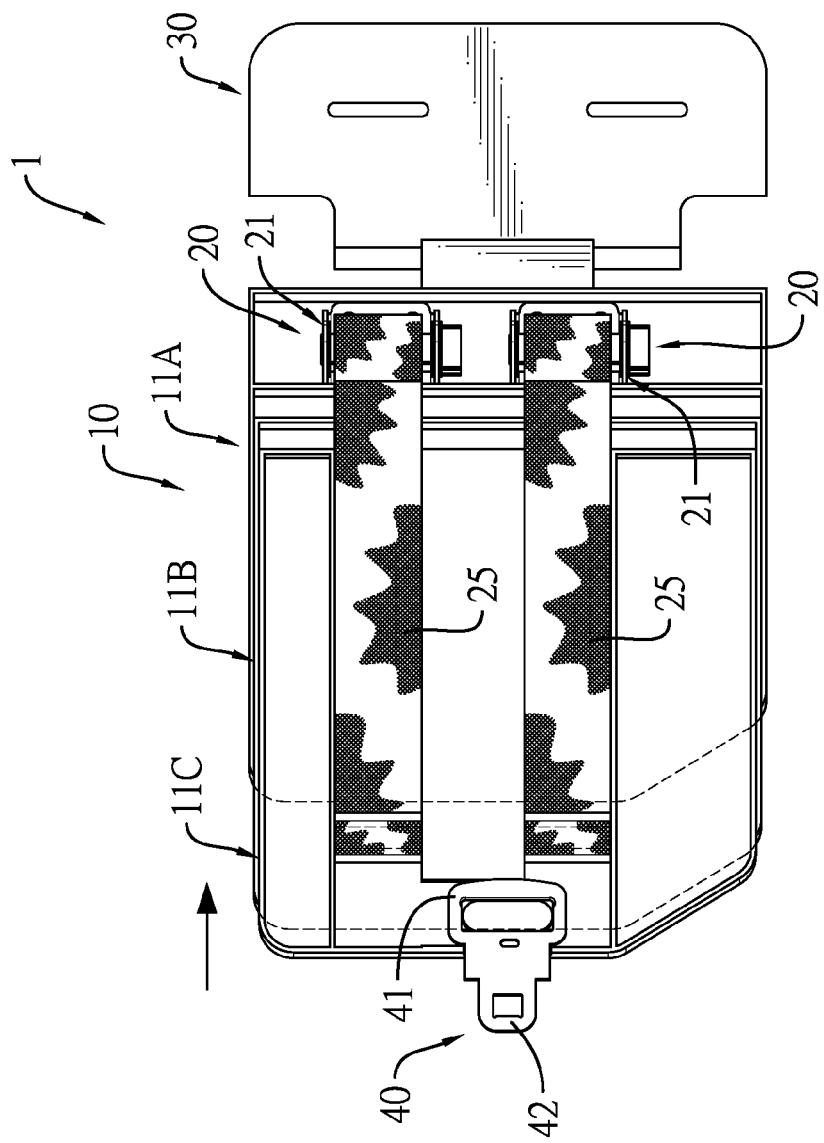
FIG. 8 is a side view of the retractable door device of a utility vehicle in FIG. 6 in a retracted state.

With reference to FIGS. 5 and 8, when the fastening assembly 40 is being removed from the latching part of the utility vehicle, the flexible elongated body 25 is automatically retracted around the coiling shaft 23 by the torque that is provided by the return spring 24. So the door plates 11A, 11B, 11C are automatically retracted by the flexible elongated body 25, and the door plates 11B and 11C are retracted into the large door plate 11A. The retractable door device 1 is formed as a shortened shape on the side entrance. The driver and passenger will not be obstructed by the retractable door device 1 when getting on or off the utility vehicle.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:
1. A retractable door device of a utility vehicle comprising:
 a retractable door plate assembly having
  multiple door plates of different sizes that are arranged and concatenated in descending order of size, the concatenated door plates being extendable to form an overall long plate and retractable into the largest one of the door plates, and each one of the door plates having
    a space communicating with the spaces of the other door plates; and
    a first end and a second end, the first end of a smaller door plate of each two adjacent door plates limited and positioned in the second end of a larger door plate of said two adjacent door plates;
at least one retractable assembly each having
    a retractor mounted in the largest door plate of the retractable door plate assembly; and
    a flexible elongated body mounted through the multiple door plates, and two ends of the flexible elongated body respectively connected to the retractor and the smallest one of the door plates, wherein the flexible elongated body can be retracted to and extracted from the retractor;
a connecting assembly mounted through the first end of the largest door plate of the retractable door plate assembly; and
a fastening assembly mounted through the second end of the smallest door plate of the retractable door plate assembly.

2. The retractable door device of a utility vehicle as claimed in claim 1, wherein
the retractor has
    a base mounted securely on an inner surface of the largest door plate;
    a coiling shaft mounted rotatably in the base, and the flexible elongated body connected to the coiling shaft; and
    a return spring having two ends, one of the ends of the return spring mounted securely on the base and the other end of the return spring connected to the coiling shaft, and the return spring providing torque acting on the coiling shaft to automatically retract the flexible elongated body around the coiling shaft.

3. The retractable door device of a utility vehicle as claimed in claim 2, wherein the flexible elongated body is a flat elongated strap, a steel wire, or a rope.

4. The retractable door device of a utility vehicle as claimed in claim 1, wherein
the multiple door plates include a large door plate, a medium door plate, and a small door plate;
the connecting assembly has
    a connecting portion connected to the first end of the large door plate; and
    a connecting plate rotatably connected to the connecting portion and having at least one fixing hole formed through the connecting plate;
the fastening assembly has
    a positioning portion mounted on one end of the fastening assembly, the positioning portion positioned in the second end of the small door plate; and
    a fastening portion mounted on another end of the fastening assembly, the fastening portion extending beyond the second end of the small door plate and having a fastening hole formed through the fastening portion.

5. The retractable door device of a utility vehicle as claimed in claim 2, wherein
the multiple door plates include a large door plate, a medium door plate, and a small door plate;
the connecting assembly has
    a connecting portion connected to the first end of the large door plate; and
    a connecting plate rotatably connected to the connecting portion and having at least one fixing hole formed through the connecting plate;
the fastening assembly has
    a positioning portion mounted on one end of the fastening assembly, the positioning portion positioned in the second end of the small door plate; and
    a fastening portion mounted on another end of the fastening assembly, the fastening portion extending beyond the second end of the small door plate and having a fastening hole formed through the fastening portion.

6. The retractable door device of a utility vehicle as claimed in claim 3, wherein
the multiple door plates include a large door plate, a medium door plate, and a small door plate;
the connecting assembly has
    a connecting portion connected to the first end of the large door plate; and
    a connecting plate rotatably connected to the connecting portion and having at least one fixing hole formed through the connecting plate;
the fastening assembly has
    a positioning portion mounted on one end of the fastening assembly, the positioning portion positioned in the second end of the small door plate; and
    a fastening portion mounted on another end of the fastening assembly, the fastening portion extending beyond the second end of the small door plate and having a fastening hole formed through the fastening portion.

7. The retractable door device of a utility vehicle as claimed in claim 1, wherein
the multiple door plates include a large door plate, a medium door plate, and a small door plate; and
the connecting assembly is mounted securely on the first end of the large door plate and has at least one fixing hole formed through the connecting assembly.

8. The retractable door device of a utility vehicle as claimed in claim 2, wherein
the multiple door plates include a large door plate, a medium door plate, and a small door plate; and
the connecting assembly is mounted securely on the first end of the large door plate and has at least one fixing hole formed through the connecting assembly.

9. The retractable door device of a utility vehicle as claimed in claim 3, wherein
the multiple door plates include a large door plate, a medium door plate, and a small door plate; and
the connecting assembly is mounted securely on the first end of the large door plate and has at least one fixing hole formed through the connecting assembly.

10. The retractable door device of a utility vehicle as claimed in claim 4, wherein
the retractable door device has a retractable assembly mounted in the retractable door plate assembly;
the positioning portion of the fastening assembly has a positioning hole formed through the positioning portion, and the flexible elongated body of the retractable assembly is connected to the positioning portion through the positioning hole; and
the retractable door plate assembly has a limiting groove formed in the small door plate, and the flexible elongated body is positioned in the limiting groove of the small door plate.

11. The retractable door device of a utility vehicle as claimed in claim 5, wherein
the retractable door device has a retractable assembly mounted in the retractable door plate assembly;

the positioning portion of the fastening assembly has a positioning hole formed through the positioning portion, and the flexible elongated body of the retractable assembly is connected to the positioning portion through the positioning hole; and the retractable door plate assembly has a limiting groove formed in the small door plate, and the flexible elongated body is positioned in the limiting groove of the small door plate.

12. The retractable door device of a utility vehicle as claimed in claim 6, wherein
the retractable door device has a retractable assembly mounted in the retractable door plate assembly;
the positioning portion of the fastening assembly has a positioning hole formed through the positioning portion, and the flexible elongated body of the retractable assembly is connected to positioning portion through the positioning hole; and
the retractable door plate assembly has a limiting groove formed in the small door plate, and the flexible elongated body is positioned in the limiting groove of the small door plate.

13. The retractable door device of a utility vehicle as claimed in claim 7, wherein
the retractable door device has a retractable assembly mounted in the retractable door plate assembly;
the positioning portion of the fastening assembly has a positioning hole formed through the positioning portion, and the flexible elongated body of the retractable assembly is connected to the positioning portion through the positioning hole; and
the retractable door plate assembly has a limiting groove formed in the small door plate, and the flexible elongated body is positioned in the limiting groove of the small door plate.

14. The retractable door device of a utility vehicle as claimed in claim 8, wherein
the retractable door device has a retractable assembly mounted in the retractable door plate assembly;
the positioning portion of the fastening assembly has a positioning hole formed through the positioning portion, and the flexible elongated body of the retractable assembly is connected to the positioning portion through the positioning hole; and
the retractable door plate assembly has a limiting groove formed in the small door plate, and the flexible elongated body is positioned in the limiting groove of the small door plate.

15. The retractable door device of a utility vehicle as claimed in claim 9, wherein
the retractable door device has a retractable assembly mounted in the retractable door plate assembly;
the positioning portion of the fastening assembly has a positioning hole formed through the positioning portion, and the flexible elongated body of the retractable assembly is connected to the positioning portion through the positioning hole; and
the retractable door plate assembly has a limiting groove formed in the small door plate, and the flexible elongated body is positioned in the limiting groove of the small door plate.

16. The retractable door device of a utility vehicle as claimed in claim 4, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

17. The retractable door device of a utility vehicle as claimed in claim 5, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

18. The retractable door device of a utility vehicle as claimed in claim 6, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

19. The retractable door device of a utility vehicle as claimed in claim 7, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

20. The retractable door device of a utility vehicle as claimed in claim 8, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

21. The retractable door device of a utility vehicle as claimed in claim 9, wherein
the retractable door device has multiple retractable assemblies being parallel to each other, and the retractable assemblies are mounted in the retractable door plate assembly;
the retractable door plate assembly has
multiple limiting grooves formed in the small door plate and corresponding in number to the retractable assemblies, the flexible elongated body of each one of the retractable assemblies is located and positioned in the limiting groove of the retractable door plate assembly;
multiple fixing portions formed respectively in the limiting grooves near the second end of the small door plate, the flexible elongated bodies are mounted securely and respectively on the fixing portions; and
a locating block formed in the second end of the small door plate; and
the positioning portion of the fastening assembly has a positioning hole formed through the positioning portion, the locating block is securely mounted in the positioning hole, and the fastening assembly is securely connected to the second end of the small door plate.

22. The retractable door device of a utility vehicle as claimed in claim 16, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

23. The retractable door device of a utility vehicle as claimed in claim 17, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

24. The retractable door device of a utility vehicle as claimed in claim 18, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

25. The retractable door device of a utility vehicle as claimed in claim 19, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

26. The retractable door device of a utility vehicle as claimed in claim 20, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

27. The retractable door device of a utility vehicle as claimed in claim 21, wherein
each one of the first ends of the medium door plate and the small door plate has a limiting block; and
the limiting blocks of the first ends are respectively formed on outer surfaces of the medium door plate and the small door plate, and the first end of the medium door plate and the first end of the small door plate are respectively connected to the second end of the large door plate and the second end of the medium door plate, and are limited by the limiting blocks.

* * * * *